United States Patent [19]

Sublett

[11] 4,063,212
[45] Dec. 13, 1977

[54] SIDE SCAN SONAR SYSTEM

[75] Inventor: Kenneth L. Sublett, Seattle, Wash.

[73] Assignee: Western Marine Electronics, Inc., Seattle, Wash.

[21] Appl. No.: 687,990

[22] Filed: May 19, 1976

[51] Int. Cl.$^2$ ............... G05B 19/40; G01D 19/38; G01D 15/28; G01S 9/66
[52] U.S. Cl. ............... 340/3 F; 346/139 A; 346/33 EC; 318/696
[58] Field of Search ............ 340/3 F; 346/139 A, 346/139 D, 66, 49, 33 EC, 35; 318/696

[56] References Cited

U.S. PATENT DOCUMENTS

| 3,005,973 | 10/1961 | Kietz | 340/6 R X |
| 3,369,250 | 2/1968 | Gifft | 346/139 X |
| 3,909,125 | 9/1975 | Reehil et al. | 318/696 X |

FOREIGN PATENT DOCUMENTS 1,202,512 10/1965 Germany .............. 346/33 EC

*Primary Examiner*—Maynard R. Wilbur
*Assistant Examiner*—Lawrence Goodwin
*Attorney, Agent, or Firm*—Seed, Berry, Vernon & Baynham

[57] ABSTRACT

A side scan sonar system which records return echoes in a manner which realistically displays the spatial relationship between the sonar transducer and the echo producing topographical feature on the sea floor. The system includes a dual channel strip chart recorder having a continuous transverse belt carrying a pair of equally spaced writing styli. The belt circulates at a constant speed with each stylus moving across the paper, first in one direction and then in the opposite direction. One of the styli records starboard channel data when that stylus is moving across the paper toward the right, while the other stylus records port channel data when that stylus is moving across the paper toward the left. The channels may be recorded individually across the entire width of the paper, or they may be recorded simultaneously with the left going stylus recording the port channel from the center to the left edge of the paper, and the right going stylus recording the starboard channel from the center to the right edge of the paper. Belt guides are provided for spacing the transverse portions of the belt loop closely adjacent each other so that port channel data is plotted on approximately the same line along the length of the paper as the starboard channel data. A sonar pulse is transmitted when the writing styli are at a predetermined starting point on the paper, and the return echoes are plotted on the paper at a point spaced from the starting point a distance corresponding to the belt movement during the period from transmission of the sonar pulse to reception of the return signal.

16 Claims, 10 Drawing Figures

MOTOR DRIVE OSCILLATOR

MOTOR POWER SUPPLY AND STEPPING PULSE SEQUENCER

MODE SELECT AND TIME-BASE GENERATOR

PAPER CONTROL

WRITE AMPLIFIERS AND MARKER GENERATOR

SIDE SCAN SONAR SYSTEM

BACKGROUND OF THE INVENTION

1. Field of the Invention

This invention relates to sonar systems and, more particularly, to a side scan sonar system which records the port data channel from right to left and the starboard data channel from left to right utilizing a continuous transverse belt carrying a writing stylus.

2. Description of the Prior Art

Two basic acoustic approaches are used to distinguish topographic features or objects on the sea floor. The first method is echo sounding which employs a vertical axis acoustic beam. Another method, called side looking or side scanning sonar, requires an acoustic beam whose main axis is slightly below horizontal. The beam is very narrow in the horizontal plane, yet sufficiently broad in the vertical plane to obtain echoes from a point on the sea floor directly below the transducer to points a large distance abeam of the transducer. The combination of the beam shape and the very short length of the acoustic pulse gives side scan sonars the capabilities to resolve small topographic irregularities and small objects on or above the sea floor. As the transducer is towed at an appropriate depth behind a towing vessel, the reflected echoes are graphically recorded to present a topographic or plan view mapping. The echoes are generally recorded on a strip chart recorder of which two basic varieties exist. In the first variety, both left channel and right channel data is recorded from left to right on the chart with the left channel recorded from the left edge toward the center and the right channel recorded from the center toward the right edge. The primary disadvantage of this variety of recorder is that, for left channel data, the spatial relationships between the echoes on the chart with respect to each other and a reference point corresponding to the transducer is the reverse of the spatial relationships between the topographical features producing the echoes with respect to each other and the transducer. Consequently, the display is somewhat confusing and thus difficult to read. The other variety of recorder records left channel data from center to left and right channel data from center to right. This recorder, which is sold by the Environmental Equipment Division of EG&G of Waltham, Massachusetts, uses dual helix electrodes which sweep out from the center of the recording drum as the drum rotates. Electrosensitive chart paper is placed between the recording drum and a transverse knife electrode so that the points of contact between the helixes and the knife sweep out from the center of the recording drum as the recording drum rotates. The helix on the right prints echoes from the starboard transducer while the helix on the left prints echoes from the port transducer. The primary problem with this system is that the knife quickly wears because of the current flowing from the knife to the helixes responsive to the returns generated by the watertransducer interface.

SUMMARY OF THE INVENTION

The primary object of the invention is to provide a side scan sonar system utilizing a continuous writing belt which displays port side echo returns from right to left and starboard side echo returns from left to right.

It is another object of the invention to provide a sonar system recorder which utilizes a continuous belt extending transversely across a strip of paper, with the belt carrying a writing stylus for producing echo markings on the paper.

It is still another object of the invention to circulate the belt using a stepping motor including a motor driving circuit which increases the motor speed from a starting speed to a constant operating speed.

It is a further object of this invention to provide a sonar system which synchronizes the sonar transmitter and receiver electronics to the position of the belt so that the position of the echo markings on the paper accurately indicate the distance between the transducer and the object producing the echoes.

These and other objects of the invention are provided by a side scan sonar system which utilizes a strip chart recorder having a continuous circulating belt extending transversely across a recording medium such as a strip of paper. The belt carries a writing stylus which produces a mark on the recording medium at the point where the stylus contacts the paper. Guide means are provided for spacing both transverse portions of the belt closely adjacent each other so that the leftward moving portion of the belt occupies approximately the same transverse line as the rightward moving portion of the belt. The sonar electronics are synchronized to the position of the belt so that a sonar pulse is transmitted when the writing stylus occupies a predetermined position. The positions of the return echoes correspond to the distance traveled by the belt during the time from transmittal of the sonar pulse to receipt of the sonar pulse echo. Port side echoes are recorded on the paper from right to left, while starboard side echoes are recorded on the paper from left to right so that the spatial relationship between the marks accurately reflects the spatial relationship between the objects producing the echoes. As a result the topographical features are displayed in an extremely readable, easily understood form.

DETAILED DESCRIPTION OF THE INVENTION

Figure 1:
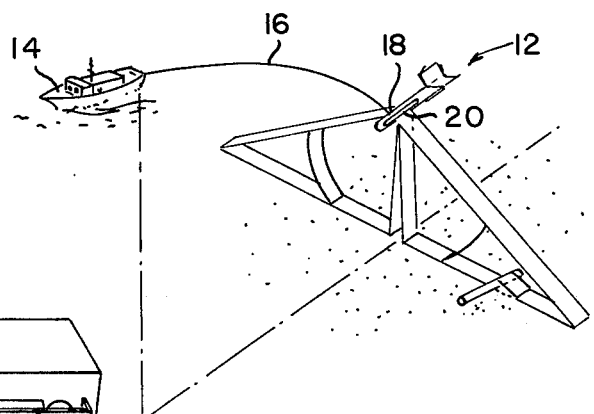
FIG. 1 is an isometric view of a side scan sonar transducer being towed by a vessel showing the transducer beam geometry.

The basic concepts of a side scan sonar system are illustrated in FIG. 1. An underwater transducer 12, commonly called a "fish" or "towfish", is towed behind a vessel 14 by a cable 14 which electrically connects the vessel 14 to the fish 12. The fish 12 contains a pair of side looking acoustic transducers 18,20 on its starboard and port sides, respectively. The transducers 18,20 have a beam pattern which is sufficiently narrow in the horizontal plane to resolve relatively small features in the beam path, yet sufficiently broad in the vertical plane to cover points from approximately beneath the towfish to points a relatively large distance to one side. In order to produce images of topographical features on the ocean floor, the transducers 18,20 are driven with a short burst of an A.C. signal, generally at ultrasound frequencies, by the transmitter portion of a conventional sonar system. The acoustic wave propagating from the transducers 18,20 reflects off topographical features on the ocean floor and are returned to the fish 12 where the reflected acoustic signals are converted to electric signals which are amplified and applied to a recording or display device. Since the fish 12 is closer to the ocean floor at points directly beneath the fish than at points abeam of the fish 12, the earliest acoustic signals that are received correspond to topographical features beneath the fish 12, while later received acoustic signals correspond to topographical features abeam of the fish 12. The reflected signals generally intensity modulate a writing stylus which moves transversely across a strip of paper so that the transverse positions of markings indicate the round trip transit time of the acoustic wave from the fish to the ocean floor. These round trip transmit times represent the positions of topographical features abeam of the fish 12. The strip of paper generally advances in a longitudinal direction at a constant rate. Since the tow vessel 14 also travels at a relatively constant rate the longitudinal positions of the markings on the paper indicate the positions of topographical features along the path of the vessel 14.

Figure 2:
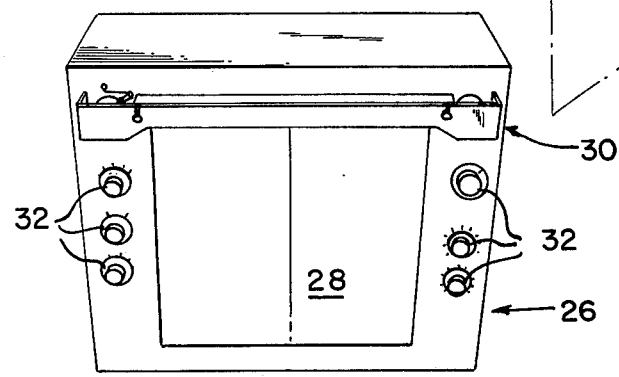
FIG. 2 is an isometric view of the recorder employed in the inventive side scan sonar system.

The recorder used to record the return echoes received by the transducers 18,20 on the fish 12 as illustrated in FIG. 2. Since this recorder may be used with the electronics packages of a variety of conventional sonar systems, these conventional sonar systems will not be described in detail. The recorder 26 includes a long strip of conventional electrosensitive paper 28 which darkens responsive to current flowing therethrough. In the specific embodiment described herein, the paper 28 is eleven inches wide and several feet long. The strip of paper 28 is advanced from top to bottom at a constant rate so that the longitudinal axis of the paper 28 represents a time axis. The marks corresponding to the return echoes are placed on the paper by a transverse writing assembly 30 described in detail below. The marks are placed on the paper 28 with respect to a fixed point of reference corresponding to the towfish 12. Where only the echo returns from the port side transducer 20 are recorded, the fixed point of reference representing the towfish 12 is at the right-hand edge of the paper 28, and the return echoes are plotted from right to left. Similarly, where return echoes are recorded only by the starboard side transducer 18 of the towfish 12, the fixed point of reference is at the left edge of the page 28 and the return echoes are plotted from left to right. Where return echoes are recorded from both the starboard and port transducers 18,20, respectively, the fixed point of reference is the center of the paper 28, the starboard return echoes are plotted from center to right and the port return echoes are plotted from center to left. The recorder 26 includes various dials and switches 32 for controlling the operation of the recorder and the sonar system.

Figure 3:
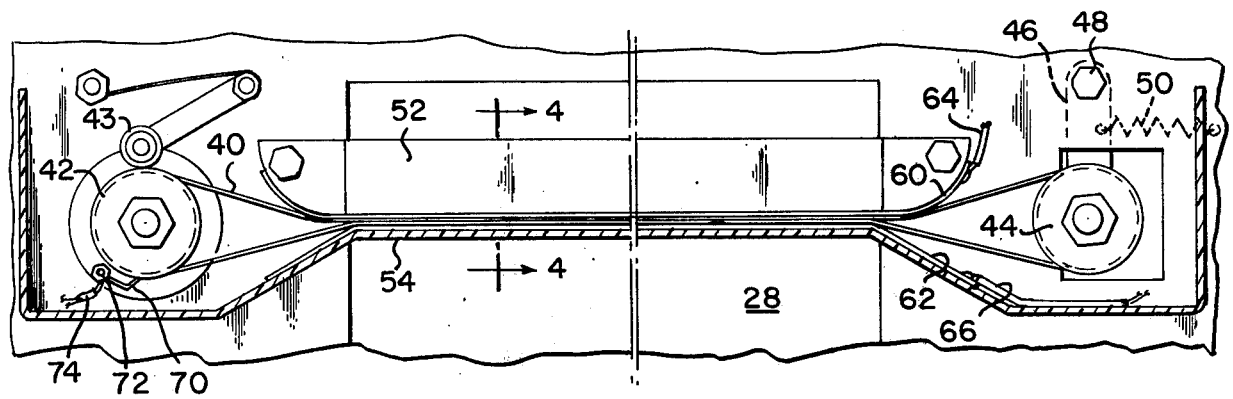
FIG. 3 is a plan view of the continuous recording belt and its associated guiding and driving structure.
Figure 4:
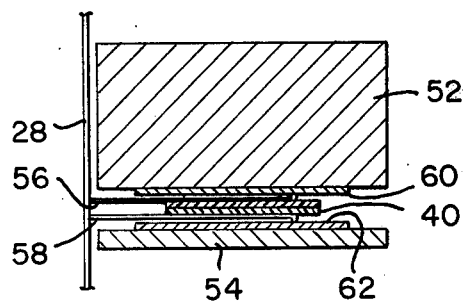
FIG. 4 is a cross sectional view of the belt and guide structure taken along the line 4—4 of FIG. 3.
Figure 5:
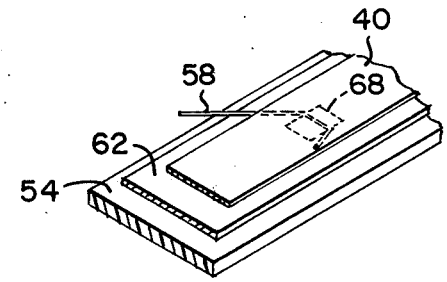
FIG. 5 is an isometric view of the recording belt illustrating the manner in which the writing stylus is secured to the belt and is electrically connected to a bus bar.

The transverse writing assembly 30 is illustrated in further detail in FIG. 3. The basic component of the writing assembly 30 is a continuous, flexible belt 40 extending across the paper 28 and engaging a drive roller 42 on the left side of the recorder 26 and an idler roller 44 on the right-hand side of the recorder 26. The idler roller 44 is pivotally secured to an elongated support member 46 which is pivotally secured to a fixed point on the recorder at 48 and resiliently biased away from the drive roller 42 by a tension spring 50 extending between the elongated member 46 and a fixed point on the recorder 26. The tension spring 50 by resiliently biasing the idler roller 44 away from the drive roller 42, maintains the belt 40 under constant tension. A pinch roller 43 resiliently biases the belt 40 against the drive roller 42 so that the friction between the roller 42 and the belt 40 is sufficient to circulate the belt 40 without substantial slippage. The drive roller 42 is connected to a stepping motor (not shown) which, as described below, rotates at a constant speed thereby continuously circulating the belt 40 at a constant speed. As further illustrated in FIGS. 4 and 5, the belt 40 is positioned between a pair of guides 52,54 which place both transverse portions of the belt 40 closely adjacent each other so that both portions of the belt 40 occupy approximately the same position along the length of the paper 28. The guide 52 is easily removable to facilitate replacement of the belt 40. As best illustrated in FIGS. 4 and 5, the belt 40 carries a pair of writing styli 56,58 which extend downwardly to contact the paper 28. The ends of the writing styli 56,58 away from the paper 28 are bent away from the belt 40 so that they contact bus bars 60,62, respectively. The bus bars 60,62 supply the writing styli 56,58 respectively, with a writing current in accordance with the intensity of the reflected acoustic signal. Since the inside face of the paper 28 is at ground potential, current flows through the paper 28 at the points where the writing styli 56,58 are in contact with the paper 28 responsive to the voltage on their respective bus bars 60,62. Power is applied to the buss bars 60,62 through conductors 64,66, respectively. The writing styli 56,58 may be secured to the belt 40 by any suitable means such as by positioning the stylus 58 between the belt 40 and a piece of tape 68 as illustrated in FIG. 5. Although the belt 40 illustrated herein carries a pair of stylus 56,58, a single stylus may be employed by separately transmitting and receiving port and starboard data, and by modifying the timing circuits of the recorder somewhat as described hereinafter. Similarly, although the writing styli illustrated herein produce marks by passing current through a sheet of electrosensitive paper, other conventional writing systems such as, for example, systems using optic or electrostatic writing styli may also be used.

Since the writing styli 56,58 are fixedly secured to the belt 40, and since it is necessary to know the position of the styli 56,58 with respect to the paper 28 in order to accurately plot points thereon, the position of the belt 40 must be measured or synchronized with the side scan sonar electronics. For this purpose, a synchronizing aperture (not shown) is placed in the belt 40 to allow a synchronizing contact 70 to contact the periphery of the drive roller 42 when the right going stylus is at the left edge of the paper and the left going stylus is at the right edge of the paper. The synchronizing contact 70 is fixedly secured to an insulated terminal 72, and is connected to a conductor 74 which leads to the SYNC IN input to the side scan sonar electronics as described below. Since the drive roller 42 is at ground potential, the SYNC IN line goes low or logic "0" when the writing styli 56,58 are at the edges of the paper 28.

In operation in the starboard recording mode, a SYNC IN pulse is generated when the right going stylus 58 is at the left edge of the paper 28. The SYNC IN pulse immediately triggers an output from the starboard transducer 18 on the fish 12. As the return echoes are received, a voltate proportional to the intensity of the echoes is placed on the right going stylus 58 through bus bar 62 which places marks on the paper 28 having an intensity corresponding to the intensity of the echo and a position with respect to the left edge of the paper 28 corresponding to the time between transmission and receipt of the signal at the transducer 18 which in turn depends upon the distance between the fish 12 and the objects producing the echoes. When the right going stylus 58 is at the left edge of the paper, the left going stylus 56 is at the right edge of the paper 28. Thus, the operation of the side scan sonar system when port data is to be recorded is substantially the same as when the starboard data is recorded. The transmission from the port transducer 20 on the towfish 12 occurs when the left going stylus 56 is at the right edge of the paper 28, and marks are placed on the paper 28 having an intensity proportional to the intensity of the echoes received by the transducer 18 and positioned at a distance from the right edge of the paper 28 corresponding to the distance between the towfish 12 and the topographical feature on the port side of the fish 12 that is producing the echo. When both port and starboard data is to be recorded timing means, as described below, cause simultaneous transmissions from both transducers 18,20 a predetermined time after the SYNC IN pulse is generated so that the transmissions occur when both the writing styli 56,58 are at the center of the page 28. Thereafter, the left going stylus 56 plots port data from center to left, and the right going stylus 58 plots starboard data from center to right. In both cases, the intensity of the marks on the paper 28 are proportional to the intensity of the received echoes, and the positions of the marks from the center of the paper 28 are proportional to the distances from the towfish 12 to the topographical features producing the echoes.

Figure 6:
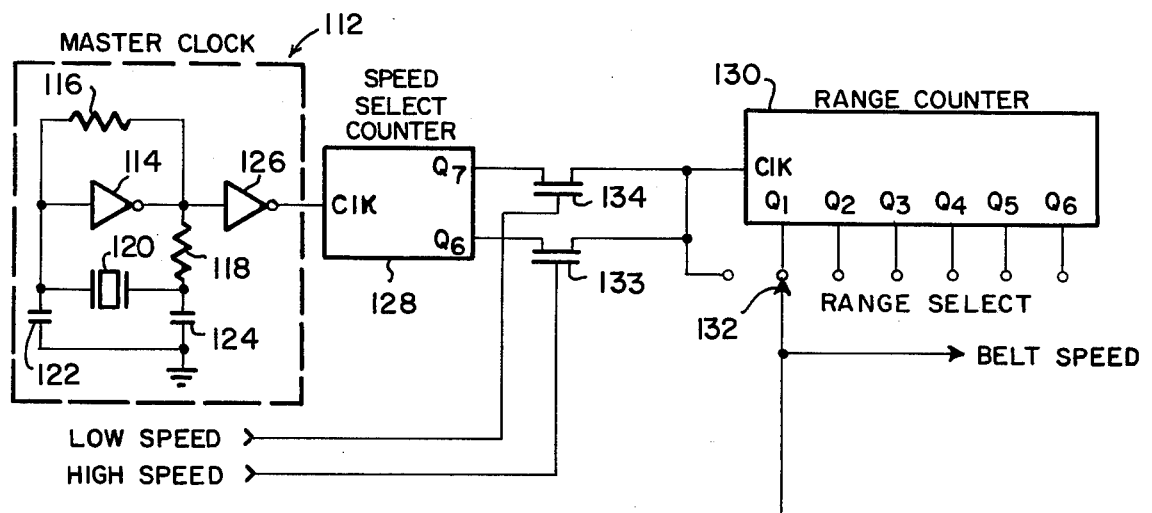
FIG. 6 is a schematic of the motor drive oscillator for generating a signal which causes the continuous belt to circulate at a predetermined speed.
Figure 6:
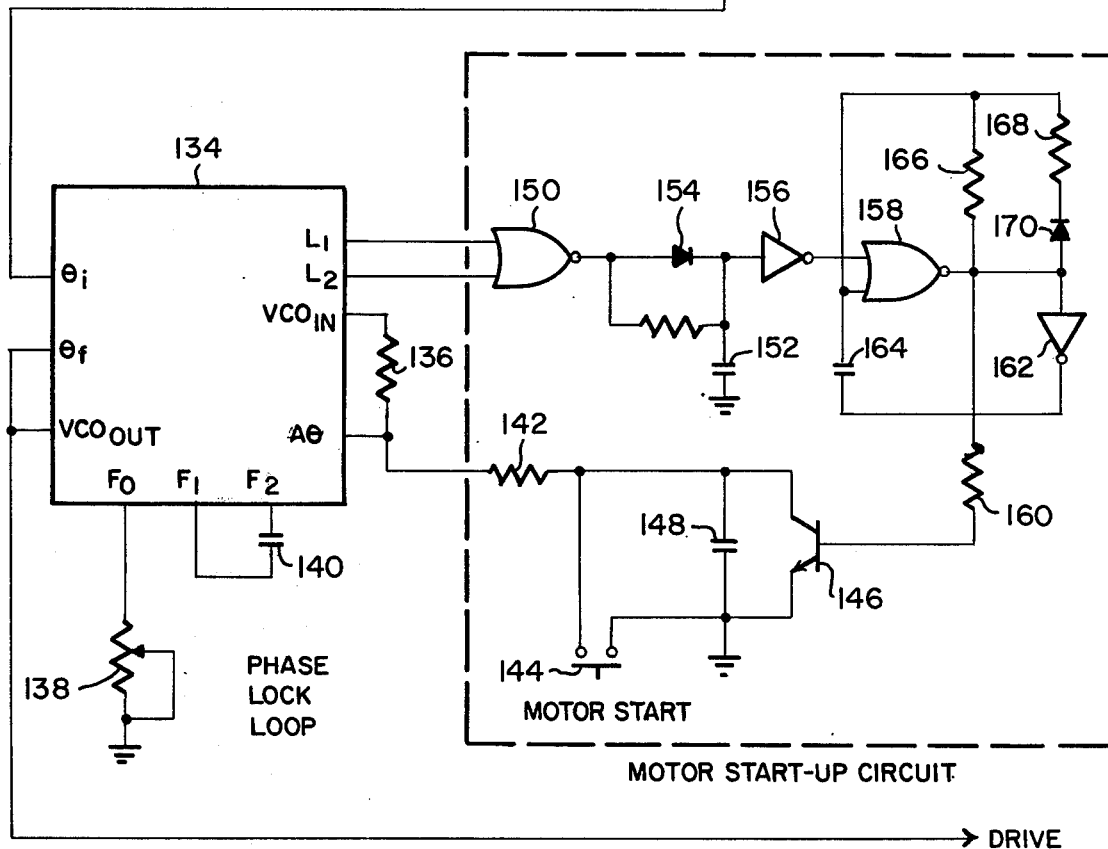

The motor drive oscillator and basic timing circuits for the side scan sonar system are illustrated in FIG. 6. A crystal controlled, 655.36 kH3 master clock 112 is formed by feeding back the output of an inverter 114 to its input through a resistor 116 in parallel with a series combination of resistor 118 and quartz crystal 120. A pair of capacitors 122,124 are connected between opposite sides of the crystal 120 and ground. The frequency of the clock 112 has been selected to indicate distance measurements in meters. However, measurements may be indicated in feet simply by changing crystals 120 to an appropriate frequency. The output of inverter 114 is squared by inverter 126 and fed to the clock input of speed select counter 128. The $Q_6$ output of speed select counter 128 is a 20,480 Hertz square wave while the $Q_7$ output of speed select counter 128 is a 10,240 Hertz square wave. Either the $Q_6$ or the $Q_7$ output of speed select counter 128 is switched to the clock input of range counter 130 by analog switch 133,134, respectively, depending upon whether the HIGH SPEED line or the LOW SPEED line is high. As explained hereinafter, analog switch 133 feeds the higher frequency output $Q_6$ of speed select counter 128 to the range counter 130 when a single channel is recorded across the entire width of the paper. The higher frequency causes the belt to circulate at a faster speed. Analog switch 134 feeds the lower frequency output $Q_7$ of the speed select counter 128 to the range counter 130 when both channels are simultaneously recorded on half the width of the paper. The lower frequency causes the belt 40 to circulate at a slower speed. The belt 40 moves at a faster speed in the single channel record mode than in the dual channel record mode since, during the same time frame, the belt moves twice the distance across the paper 28 in the single channel record mode than in the dual channel record mode. The range counter 130 generates on a plurality of outputs $Q_1$-$Q_6$ a BELT SPEED signal having a frequency which is the same frequency as the master clock output divided by successive powers of 2. One of the outputs $Q_1$-$Q_6$ as determined by a range select switch 132 sets the range to which the sonar is set. The lowest frequency signal $Q_6$, by driving the belt at the lowest speed, allows echoes from topographical features a farther distance from the towfish 12 to be returned to the towfish 12 before the writing styli 56,58 reach the edge of the paper 28. Consequently, the lower frequency signals provide a greater range.

As explained hereinafter, the motor driving the belt 40 is a 4-wire stepping motor driven with four properly sequenced pulses. Since a stepping motor does not develop significant torque unless the motor is syncronized to the driving pulses, the motor must be started at a relatively slow speed before being "ramped" up to operating speed. The ramping is achieved by the use of a phase-locked loop which gradually increases in frequency until it is in phase with the BELT SPEED signal selected by range selection switch 132. Phaselock loop have been familiar to those skilled in the art for many years, and their structure and theory of operation are well described in treatises and technical journals. The phase-locked loop 134 is a commercially available integrated circuit which may be an RCA CD 4046. In operation, the phase-lock loop 134 compares the phase of a signal at the $\theta_i$ input with the phase of a signal at the $\theta_f$ input, and produces a signal proportional thereto at the $\Delta \theta$ output of the phase-lock loop 134. The $\Delta \theta$ signal, when connected to the $VCO_{IN}$ terminal of the phase-lock loop 134 through resistor 136, controls the operating frequency of a voltage controlled oscillator. When the output of the voltage controlled oscillator at the $VCO_{OUT}$ signal line is connected to the $\theta_f$ input of the phase-lock loop 134, the operating frequency of the voltage controlled oscillator is identical to the frequency of the signal at the $\theta_i$ input of the phase-lock loop 134 when the loop is locked. A variable resistor 138, in combination with a capacitor 140, selects the free running, or unlocked, frequency of the voltage controlled oscillator in the absence of an appropriate signal at the $\theta_i$ input. The $L_1$ and $L_2$ terminals of the phase-lock loop 134 are lock detector signals, and are high or logic "1" when the loop is locked, i.e., the frequency and phase of the signal at the $\theta_i$ input is equal to the frequency and phase of the signal at the $\theta_f$ input. Since the output frequency of the voltage controlled oscillator is proportional to the voltage at the $\Delta \theta$ terminal, the VCO operating frequency may be pulled in either direction by changing the voltage at the $\Delta Q$ input. In order to produce a DRIVE signal having a relatively low starting frequency which ramps to a higher frequency, the $\Delta \theta$ input to the phase-lock loop 134 is initially grounded thereby lowering the operating frequency of the voltage controlled oscillator at the $VCO_{OUT}$ terminal of phase-lock loop 134. The voltage control oscillator output $VCO_{OUT}$ is then allowed to ramp up to match the frequency of the signal at the $\theta_i$ input. The $\Delta \theta$ input may be grounded through resistor 142 either by closing the motor start switch 144 or by saturating transistor 146. Capacitor 148 is provided to filter the high frequency components from the $\Delta \theta$ terminal of the phase-lock loop 134 and to control the ramping characteristics of the phase-lock loop 134. The motor start switch 144 is manually actuated each time the recorder is placed in operation, while transistor 146 is automatically saturated when the phase-lock loop 134 becomes unlocked, i.e., when the phase of the signal at the $\theta_i$ input is not identical to the phase of the signal at the $\theta_f$ input. A low or a logic "0" at either the $L_1$ or $L_2$ outputs of the phase-lock loop 134 responsive to the loop being in the unlocked condition is detected by NOR gate 150 which outputs a high or logic "1". The low driving point impedance of NOR gate 150 causes rapid charging of capacitor 152 through diode 154 producing a logic "0" at the output of inverter 156 which enables a motor start-up circuit as explained hereinafter. A "0" at the output of inverter 156 produces a "1" at the output of NOR gate 158 which saturates transistor 146 through resistor 160 discharging capacitor 148 and causing a substantial reduction in frequency of the drive signal at the $VCO_{OUT}$ terminal of the phase-lock loop 134. the "1" at the output of NOR gate 158 produces a low or a logic "0" at the output of inverter 162 and charges capacitor 164 through resistor 166 and the series combination of resistor 168 and diode 170. Because of the relatively low value of resistor 168, capacitor 164, quickly charges to a voltage sufficient to produce a "0" at the output of NOR gate 158 thereby cutting off transistor 146 and allowing the voltage controlled oscillator of the phase-lock loop 134 to ramp up to operating frequency. Capacitor 164 then slowly discharges through resistor 166 and, if the phase-lock loop 134 is still unlocked when the capacitor 164 is discharged, the output of NOR gate 158 once again goes high to saturate transistor 146. If the phase-lock loop 134 has locked by the time capacitor 164 is discharged the "1" at the output of inverter 156 disables NOR gate 158 to prevent further recycling of the start-up circuit. In summary, the motor drive oscillator circuitry illustrated in FIG. 1 provides a constant frequency square wave to the phase-lock loop 134 having a frequency selected by either the HIGH SPEED or LOW SPEED signal lines, depending upon whether one channel or both channels are to be recorded, and the range select switch 132, which determines which output of the range counter 130 is connected to the phase-lock loop. The phase-lock loop produces a square wave signal on the DRIVE line having a frequency which falls to a relatively low value upon actuation of the motor start switch 114 or upon the phase-lock loop 134 going into an unlock condition, and then ramps up to a constant frequency equal to the frequency of the BELT SPEED signal.

Figure 7:
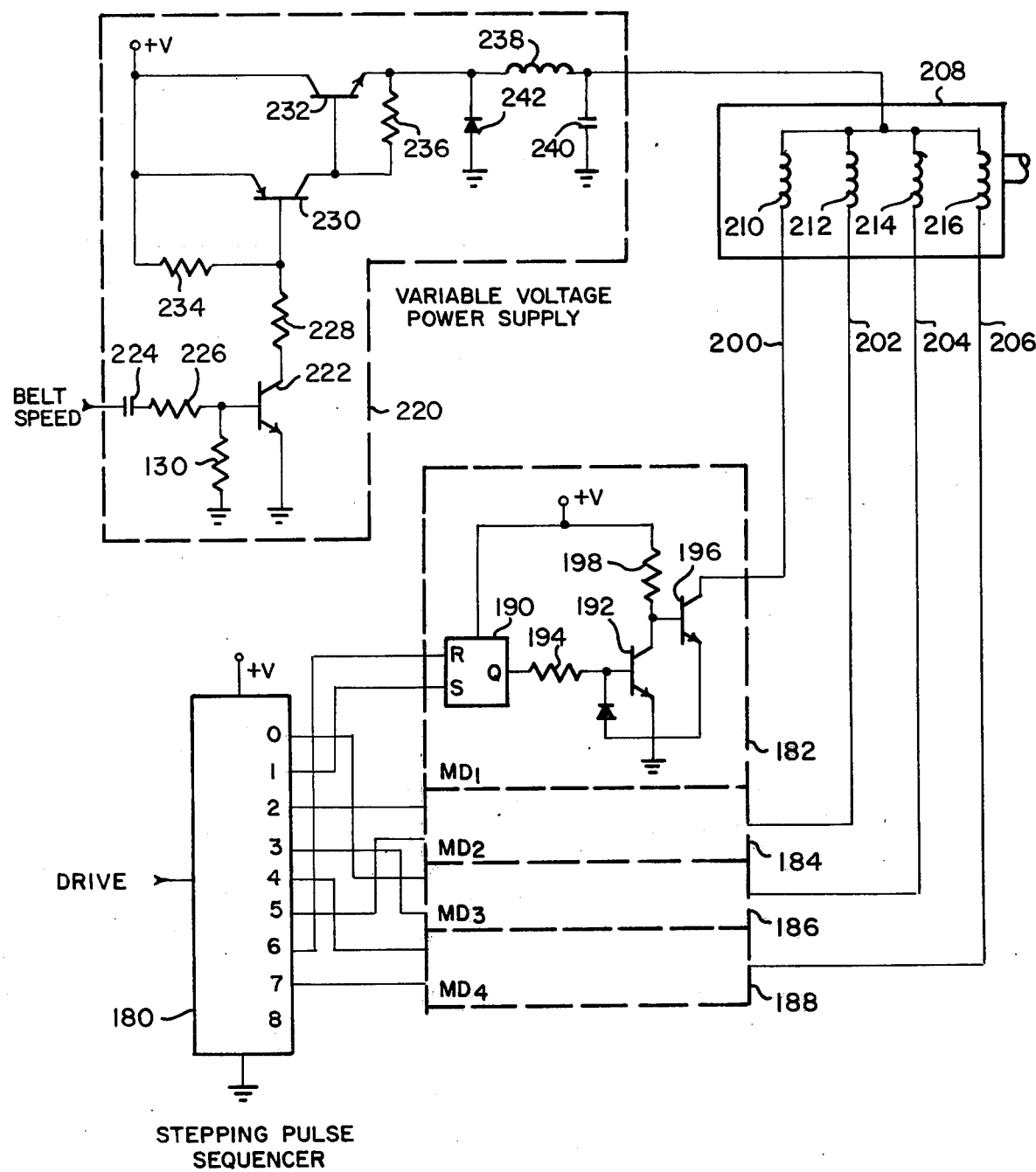
FIG. 7 is a schematic of the motor power supply and stepping pulse sequencer for generating properly sequenced stepping pulses for the belt drive motor and for adjusting the power supplied to the motor in accordance with motor speed.

The power supply for the belt drive stepping motor and circuits for providing the properly sequenced pulses to the stepping motor is illustrated in FIG. 7. The DRIVE pulses from the phase-lock loop 134 (FIG. 6) increment an 8 digit decimal counter functioning as a stepping pulse sequencer 180. For each DRIVE pulse, a successive output of the sequencer 180 goes high or logic "1". The outputs of the sequencer 180 are connected to 4 identical motor drive (MD) circuits 182–188 which generate high power pulses having a predetermined duration. Each of the motor drive circuits 182–188 include a set-reset flip-flop 190 connected to appropriate outputs of the sequencer 180. The Q output of the flip-flop 190 is connected to the base of a transistor 192 through resistor 194 so that when the Q output goes high, transistor 192 saturates thereby cutting off transistor 196. When the Q output of flip-flop 190 is low, transistor 192 is at cutoff allowing current to flow through resistor 198 to saturate transistor 196. In summary, for motor drive circuit 182, transistor 196 saturates on the 6 count of sequencer 180 when flip-flop 190 is placed in the reset condition. Transistor 196 is cut off on the one count of sequencer 180 when flip-flop 190 is set. Thus, the stepping pulse sequencer in combination with the motor drive circuits sequentially ground each of the 4 output lines 200–206. The output lines 200–206 are connected to a belt stepping motor 208 having 4 field coils 210–216 each connected between a common power line and their respective output lines 200–206.

As the motor 208 is driven at higher speeds responsive to higher DRIVE signal frequencies, the power supplied to the motor 208 must be increased by increasing the supply voltage. This is achieved by using a varible voltage power supply 220 which generates a voltage proportional to the frequency of the BELT SPEED signal at the output of the range counter 130 (FIG. 6). The BELT SPEED input is connected to the base of a transistor 222 through capacitor 224 and resistor 226 such that at higher frequencies, the average current into the base of transistor 222 is increased thereby causing an increase in the average current flowing through resistor 228. A resistor 130 is placed in parallel with the base emitter junction of transistor 222 to discharge capacitor 224 between BELT SPEED pulses. As the average current through transistor 222 is increased, the voltage at the base at transistor 230 is reduced causing increased current flow through transistor 230 and an increased voltage at the collector of transistor 230 which in turn increases the voltage at the emitter of transistor 232. Resistors 234 and 236 are placed between the emitters and bases of transistors 230 and 232, respectively. As the belt speed frequency decreases, the current through transistor 222 is reduced, driving transistor 230 toward cutoff and causing a consequential reduction in voltage at the emitter of transistor 232. The voltage at the emitter of transistor 232 is filtered by inductor 238 and capacitor 240 to provide a relatively constant voltage to the stepping motor 208. A back-biased diode 242 is placed between the emitter of transistor 232 and ground to protect the transistor 232 from the reverse EMF pulse generated by inductor 238 as the current flowing therethrough is suddenly terminated.

Figure 8:
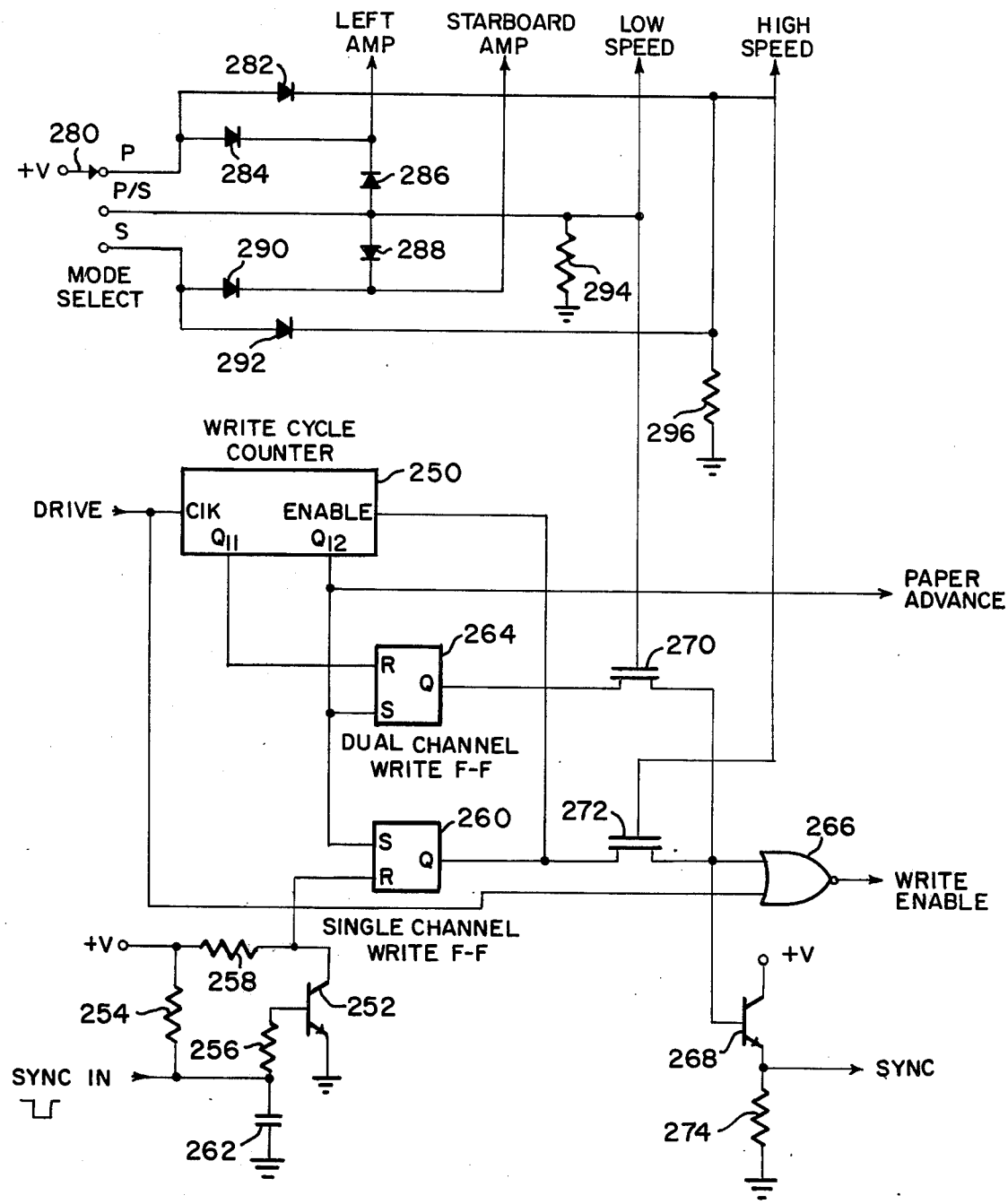
FIG. 8 is a schematic of the mode select and timebase generator for selecting left, right, or left/right modes and for controlling the time and duration of the write cycle.

The circuits for selecting either the single channel or dual channel record mode and for generating the writing time base are illustrated in FIG. 8. The DRIVE pulses generated by the phase-lock loop 134 (FIG. 6), increment a binary write cycle counter 250 which controls the timing and duration of WRITE ENABLE pulses which allow the styli 56,58 (FIGS. 3–5) carried by the belt 40 to mark the paper. The time base for one sweep of the styli 56,58 across the 11 inches of paper 28 is 2048 DRIVE pulses. When both the starboard and port channels are to be recorded, WRITE ENABLE pulses are generated during the 1024 DRIVE pulses (corresponding to 5.5 inches of travel) starting from 1024 DRIVE pulses after the SYNC IN pulse (when the styli 56,58 have traveled 5.5 inches and thus are at the center of the page). When either the starboard or the port channels, but not both, are to be recorded WRITE ENABLE pulses are generated during the 2048 DRIVE pulses (corresponding to 11 inches of travel) starting from the SYNC IN pulse (when the styli 56,58 are at the right and left edges of the paper 28, respectively). However, in the single channel mode the 2048 DRIVE pulses occur in the same time period that 1024 DRIVE pulses occur in the dual channel mode. Thus the range from the towfish 12 (FIG. 1) represented by 5.5 inches in the dual channel mode is identical to the range represented by 11 inches in the single channel mode. These functions are accomplished by connecting either the Q6 or Q7 output of the speed select counter 128 (FIG. 6) to the range counter 130. When the $Q_6$ output of speed select counter 128 is connected to the range counter 130, the belt 40 travels 11 inches in the same time period as the belt 40 travels 5.5 inches when the $Q_7$ output of speed select counter 128 is connected to the range counter 130. The write cycle is initiated responsive to a SYNC IN pulse from the SYNC contact 70 (FIG. 3) generated when the right going stylus reaches the left edge of the paper. The SYNC IN pulse cuts off transistor 252 which is normally in a saturated condition by current flowing through resistors 254 and 256 causing current to flow through resistor 258. Thus, the reset (R) terminal of set-reset flip-flop 260 is normally low or logic "0". The write cycle is initiated with the negative-going SYNC IN pulse, discharges capacitor 262 and cuts off transistor 252 to reset flip-flop 260. The logic "0" at the Q output of flip-flop 260 enables write cycle counter 250 to count DRIVE pulses. At a count of 1024 (when the styli 56,58 are at the center of the paper 28), the $Q_{11}$ output of the counter 250 goes high or logic "1" to reset flip-flop 264 producing a low or logic "0" at the Q output of flip-flop 264. At a count of 2048 (when the styli have traveled across the entire width of the paper 28) the Q output of the write cycle counter 250 goes high setting flip-flops 260 and 264. In summary, the negative-going SYNC IN pulse resets flip-flop 260 and initiates counting of the write-cycle counter 250. At the count of 1024, flip-flop 264 is reset, and at a count of 2048 both flip-flops 260 and 264 are set.

The output of either flip-flop 260 or flip-flop 264 is connected to NOR gate 266 and the base of transistor 268 depending upon the conductive state of analog switches 270,272. The output of flip-flop 264 is connected to NOR gate 266 when the LOW SPEED line is high while the output of flip-flop 260 is connected to the NOR gate 266 when the HIGH SPEED line is high. The low or logic "0" from the output of either flip-flop 260 or flip-flop 264 gates the DRIVE pulses through NOR gate 266 so that the DRIVE pulses are gated to the WRITE ENABLE output during the write cycle selected by one of the two analog switches 270 and 272.

At the start of the write cycle, transistor 268 is cut off thereby connecting the SYNC terminal to ground through resistor 274. Thus, as the right going stylus reaches the left edge of the paper, flip-flop 260 is reset and the write-cycle counter 250 begins incrementing. In one of the single channel record modes the HIGH SPEED line is high or logic "1" causing DRIVE pulses to be immediately gated to the WRITE ENABLE line and the SYNC terminal to go low. At a count of 2048 flip-flop 260 is set thereby disabling DRIVE pulses from passing through NOR gate 266 to the WRITE ENABLE line. Thus WRITE ENABLE pulses are produced during the entire time that the styli 56,58 move across the paper. In the dual channel record mode write cycle counter 250 begins incrementing responsive to receipt of a SYNC IN pulse. However, since the output of flip-flop 264, and not flip-flop 260, is connected to NOR gate 266 and transistor 268 WRITE ENABLE pulses and the SYNC pulse are not produced until count 1024 of the write cycle counter 250 (when the styli are at the center of the paper 28). At a count of 2048 flip-flop 264 is set thereby disabling DRIVE pulses from passing through NOR gate 266 to the WRITE ENABLE line. Thus WRITE ENABLE pulses are produced during the time that the left going stylus 56 moves from center to the left and the right going stylus 58 moves from center to the right edge of the paper 28. In both the single and dual channel modes the SYNC pulse performs the same function, i.e., to synchronize the sonar electronics to the position of the styli 56,58 so that an acoustic signal is transmitted from the transducers 18,20 on the towfish 12 at the proper time. At the end of each write cycle (when the write cycle counter 250 is at count 2048) a PAPER ADVANCE pulse is sent to the paper control circuitry (FIG. 9) to advance the paper 28 as explained hereinafter.

The recording modes are selected by a mode switch 280 which connects a high or logic "1" to either the port, port/starboard or starboard terminals of a diode matrix formed by diodes 282–292. When the switch 280 selects the port mode, current flows through diodes 282,284 placing the L AMP and HIGH SPEED lines at logic "1". A blocking diode 286 prevents current from flowing to the LOW SPEED line. Similarly, when the switch 280 selects the starboard mode, current flows through diodes 290,292 placing the HIGH SPEED and R AMP lines at logic "1". Blocking diode 288 prevents current from flowing to the LOW SPEED line. When the mode select switch 280 selects the port/starboard, or dual channel, recording mode, the LOW SPEED line, normally held low through resistor 294, goes high and current flows to the L AMP and R AMP lines through diodes 288 and 286. Blocking diodes 284 and 290 prevent current flow to the HIGH SPEED line which is held low through resistor 296.

Figure 9:
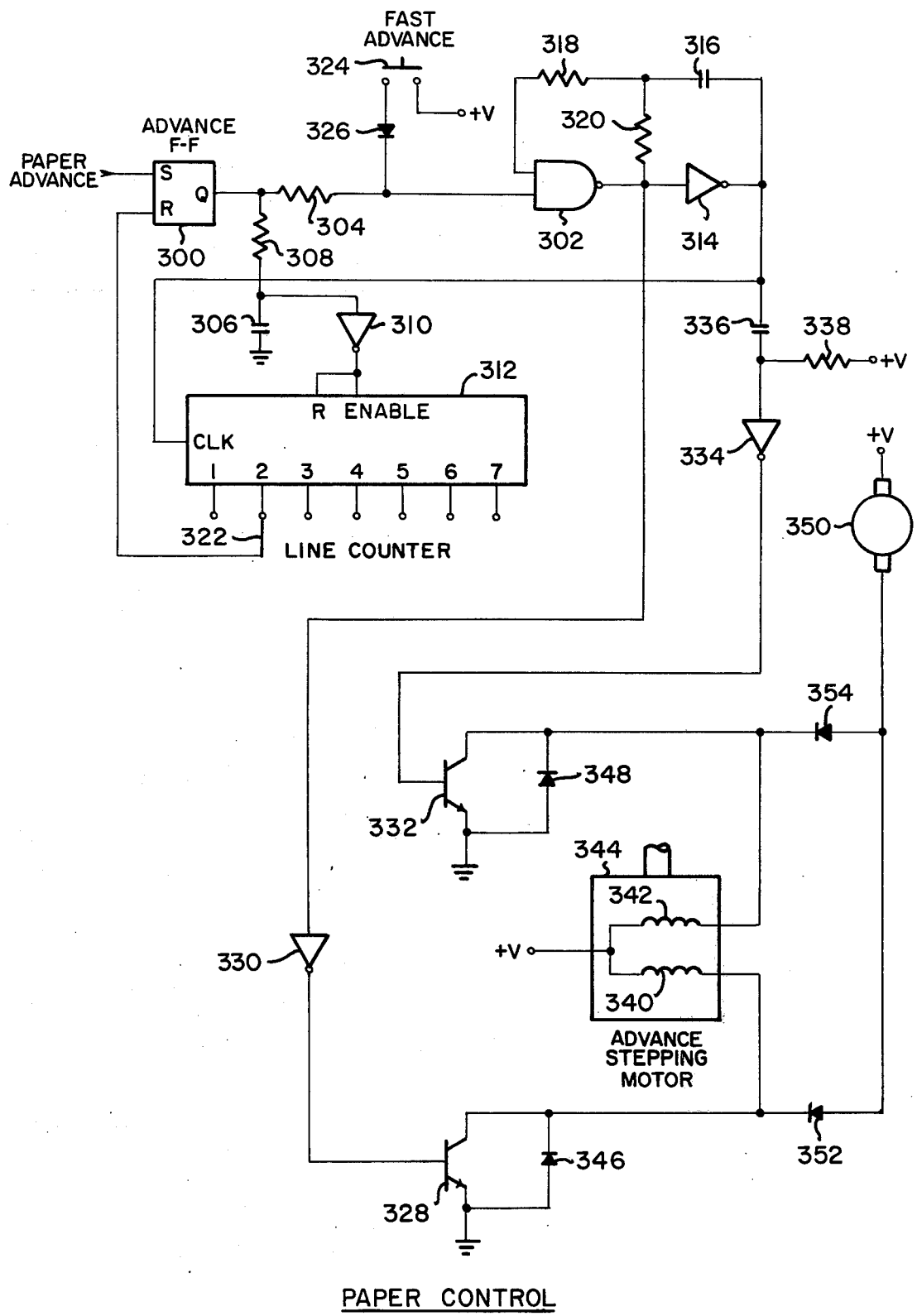
FIG. 9 is a schematic of the paper control circuitry for advancing the paper in a longitudinal direction at a predetermined speed.

The circuitry for controlling the movement of paper beneath the belt is illustrated in FIG. 9. As mentioned above, PAPER ADVANCE pulse is produced at the end of the write cycle (count 2048 of the write cycle counter 250 (FIG. 8)) which sets advance flip-slop 300 and places a high or logic "1" at the input to NAND gate 302 through resistor 304. At the same time, capacitor 306 charges through resistor 308, and, after a predetermined time, causes a "0" at the output of the invertor 310 which resets and enables line counter 312. NAND gate 302, in combination with inverter 314, capacitor 316 and resistors 318,320, implement an oscillator which is enabled either by a "1" at the Q output of the flip-flop 300 or by closing a fast advance switch 324 which causes a "1" at the input to NAND gate 302 through diode 326. The oscillator pulses at the output of inverter 314 increment the line counter 312 until the output selected by line counter switch 322 goes high thereby resetting advance flip-flop 300 and disabling the oscillator. Thus, if the switch 322 is connected to the number 2 output of line counter 312, a PAPER ADVANCE pulse generates 2 pulses at the outputs of NAND gate 302 and inverter 314. When the fast advance switch 324 is closed, NAND gate 302 is enabled causing pulses to be produced at the output of inverter 314 for as long as the fast advance switch 324 is actuated.

The selection of various outputs of line counter 312 by switch 322 establishes different rates at which the paper 28 moves beneath the belt 40 thereby establishing a variable time base for the recorder. Each of the pulses at the output of NAND gate 302 saturates transistor 328 through inverter 330, while each of the pulses at the output of inverter 314 saturates transistor 332 through inverter 334 and capacitor 336. The input of inverter 334 is normally high or logic "1" through resistor 338. Thus, transistors 328 and 332 are alternately driven toward cutout and saturation when the oscillator is enabled responsive to a high or logic "1" at the input of NAND gate 302. The collectors of transistors 328, 332 are connected to their respective field coils 340, 342 of takeup stepping motor 342 which are both connected to a common voltage supply line. Diodes 346,348 are placed across the emitter and collector of transistors 328,332, respectively, to protect the transistors against back EMF transients generated by the field coil 340,342. A paper takeup motor 350 is also driven by transistors 328,332 through diodes 352,354, respectively. Therefor, the takeup motor runs only when paper is being advanced resulting in reduced wear on a paper takeup clutch (not shown) connected between the motor 350 and paper takeup spool.

Figure 10:
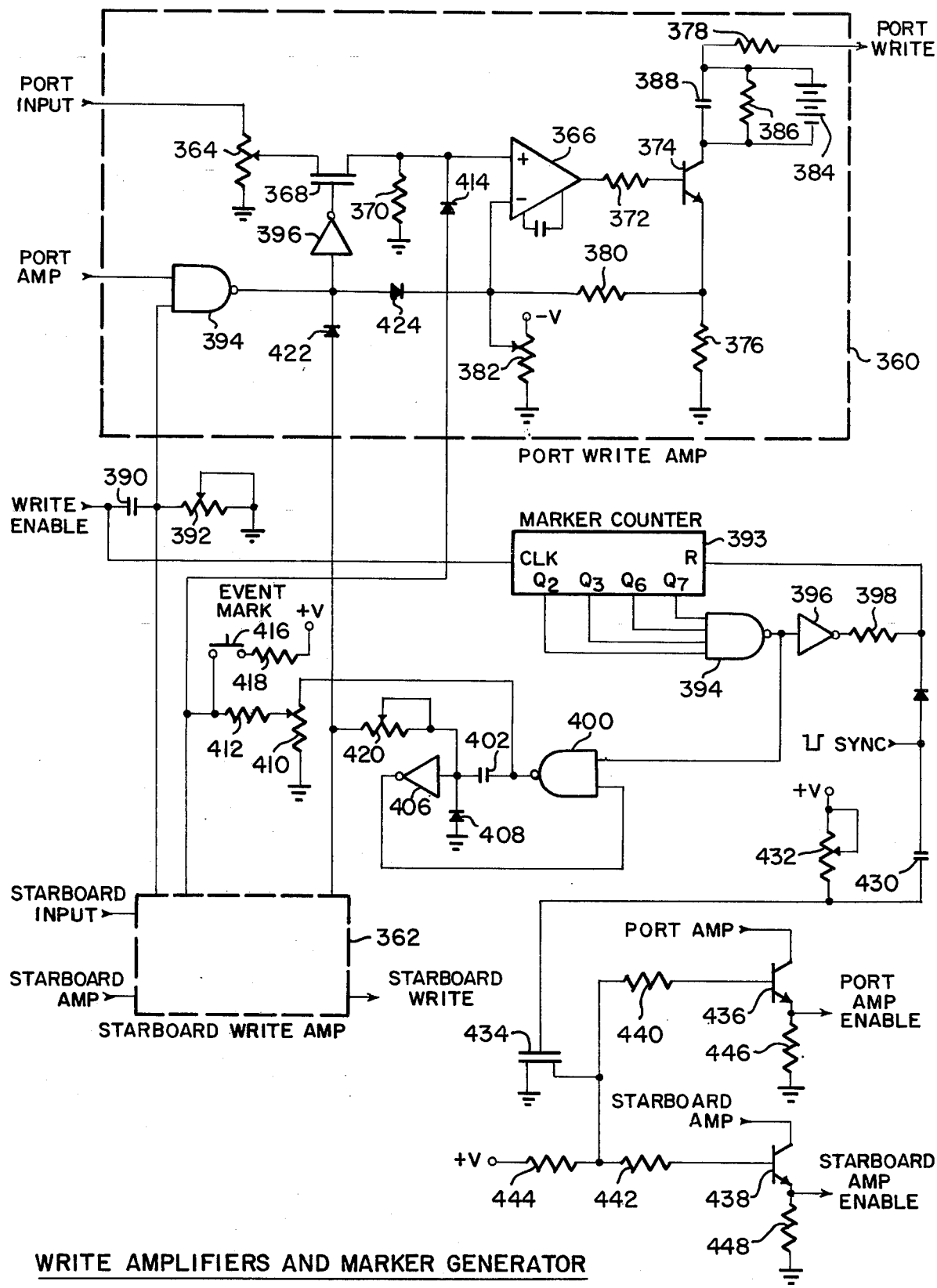
FIG. 10 is a schematic of the write amplifiers and marker generator for controlling the current flowing through the writing styli and for producing appropriate range marks on the strip chart.

The write amplifiers and marker generator circuitry is illustrated in FIG. 10. As mentioned previously, the paper 28 used with the recorder is electrosensitive, and the darkness of the marking depends on both the amount of current flowing through the paper as well as the period of time the current is flowing. Therefore, it is important to control the current flow to the writing styli 56,58. For this purpose, write amplifiers 360,362 are provided for the port and starboard channels, respectively, which generate a writing current proportional to the applied input voltage. The gain of the amplifier 360 is controlled by a potentiometer 364 connected between the input terminal and ground. The potentiometer center tap is connected to the non-inverting terminal of an operational amplifier 366 through analog switch 368. A resistor 370 connected between the non-inverting terminal and ground holds the non-inverting terminal of the amplifier 366 at zero volts when the switch 368 is open. The output of operational amplifier 366 is connected through resistor 372 to transistor 374 having a current feedback resistor 376 connected between its emitter and ground. The voltage across resistor 376 is proportional to the current through transistor 374 which is approximately equal to the current flow through resistor 378 and the writing stylus connected to the PORT WRITE terminal of the port write amplifier 360. The current feedback voltage across resistor 376 is fed back to the non-inverting terminal of operational amplifier 366 through resistor 380. A quiescent current flow through resistor 376 is established by adjusting the voltage on the wiper of potentiometer 382 which is connected between a negative voltage source and ground. A floating DC power supply, such as a battery 384 in parallel with a resistor 386 and a filter capacitor 388, is placed between resistor 378 and the collector of transistor 374. Since the port write amp is a current source, the current through the writing stylus is determined by the PORT INPUT voltage, and is independent of the resistance of the electrosensitive paper. If the resistance of the paper 28 decreases, the current flowing through the paper 28 tends to increase thereby increasing the feedback voltage across resistor 376 which, in turn, reduces the voltage at the output of operational amplifier 366 to maintain the current constant. The intensity of the markings on the paper is proportional to the amount of time the current is flowing through the paper as well as to the magnitude of the current. Thus, for a given input voltage to produce a given intensity of marking on the paper regardless of the range setting, the system must compensate for the different rates at which the styli 56,58 move across the paper responsive to the different ranges selected by the range switch 132 (FIG. 6). The WRITE ENABLE pulses generated during the write cycle are differentiated by a capacitor 390 which is connected to ground through a variable resistor 392. The positive going pulses occuring on the leading edge of each WRITE ENABLE pulse are connected to the input of NAND gate 394. NAND gate 394 is enabled by placing a high or logic "1" at the PORT AMP terminal responsive to placing mode switch 280 in the port channel or port/-starboard channel record modes (FIG. 8). The pulses at the output of NAND gate 394 are inverted by inverter 396 to periodically place analog switch 368 in its conductive state. Variable resistor 392 is adjusted so that the duration of the pulse produced at the output of NAND gate 394 for each WRITE ENABLE is less than the duration of the shortest WRITE ENABLE pulse (corresponding to the shortest range selected by the range select switch 132). Since each WRITE ENABLE pulse represents stylus movement of 1/2048 the distance across the paper 28, and since the duration of the pulse at the output of NAND gate 394 is constant regardless of the frequency of the WRITE ENABLE pulses, the time period that current flows through the paper 28 for each DRIVE pulse is constant regardless of the frequency of the DRIVE pulses. Thus, the intensity of the marks placed on the paper 28 for a given PORT INPUT voltage is independent of the speed which the styli 56,58 move across the paper 28.

The circuitry illustrated in FIG. 10 also places a calibrated marker on the paper every 102 steps. The WRITE ENABLE pulses are counted by a marker counter 393. Counter 393 has its 102 count decoded by NAND gate 394 which subsequently resets the marker counter 393 through inverter 396 and resistor 398 so that marker counter 393 repetitively counts up to 102. The high or logic "1" at the output of NAND gate 394 at the 102 count enables a one-shot implemented by NAND gate 400, capacitor 402, variable resistor 410, inverter 406 and diode 408. The pulses at the output of NAND gate 400 are coupled to the operational amplifier 366 through marker intensity adjustment potentiometer 410, resistor 412 and diode 414. Alternatively, an event may be marked on the paper 28 by manually closing an event switch 416 which connects a voltage to the non-inverting terminal of amplifier 366 through resistor 418 and diode 414. Diode 422 and the corresponding diode (not shown) in the starboard write amp 362 discharge capacitor 402 at a rate directly proportional to the frequency of the WRITE ENABLE pulses since the period that the cathode of diode 422 is at ground or logic "0" is directly proportional thereto. As a result the physical length of the range mark on the paper 28 is constant regardless of the speed at which the belt 40 circulates. When the port write amplifier is disabled responsive to the PORT INPUT being "0", the "1" at the output of NAND gate 394 is fed through diode 424 to the summing junction of operational amplifier 366 to place its output below the cutoff voltage of transistor 374.

Capacitor 430, resistor 432 and analog switch 434 form a one-shot multivibrator, as explained below. Analog switch 434 is normally held in the conductive state by the positive voltage applied through resistor 432 thereby grounding the bases of transistors 436,438 through resistors 440 and 442, respectively. The leading edge of the SYNC pulse is differentiated by capacitor 430 causing a short negative-going pulse which momentarily places analog switch 434 in its non-conducting state. Current then flows through resistors 444, 440,442 to place a short positive-going pulse across resistors 446,448 if the PORT AMP and STARBOARD AMP lines, respectively, are high. These AMP ENABLE pulses are applied to the appropriate receiver channel of the sonar electronics.

In operation, the record mode is initially selected by modes switch 280 (FIG. 8) to record either the port, the starboard or both the port and starboard channels. The mode selected determines the frequency of the signal applied to the range counter 130 and, hence, the speed at which the writing belt 40 circulates. A range is then selected by the range switch 132 (FIG. 6) thereby selecting the frequency applied to the phase-lock loop 134. At the same time, the paper advance speed or time base may be selected by paper advance switch 322 (FIG. 9). Motor start switch 144 is then manually actuated to substantially reduce the frequency of the DRIVE pulses and to subsequently allow it to ramp up to the frequency of the signal selected by the range switch 132. An unlock condition of the phase-lock loop 134 caused by, among other things, a change in the setting of mode switch 280 or range switch 132, is detected by the motor startup circuitry which momentarily reduces the frequency of the DRIVE pulses and subsequently allows the frequency to ramp up to operating frequency. The DRIVE pulses are applied to the stepping pulse sequencer and motor drive circuitry which produces an appropriate sequence of pulses to drive the stepping motor 208 thereby causing the write belt 40 to circulate. The variable voltage power supply increases the voltage to the motor 208 at the higher operating speeds.

When the right-going stylus is at the left edge of the paper, a SYNC IN pulse is produced which enables the write cycle counter 250 and, if the mode switch 280 is in the Port or starboard channel modes, enables NOR gate 266 to produce WRITE ENABLE pulses which generate markings on the paper. If the mode switch 280 is in the port/starboard mode, NOR gate 266 is not enabled until the 1024 count of the write cycle counter 250 at which time the right going stylus is at the center of the page. At the 2048 count of the write cycle counter, NOR gate 266 is disabled and a PAPER ADVANCE pulse is sent to the paper control circuitry illustrated in FIG. 9. The PAPER ADVANCE pulse generates a number of stepping pulses to the advance stepping motor 344 depending upon the line setting of switch 322. The WRITE ENABLE pulses are applied to the write amplifiers 360,362 which produce markings on the paper at the location of the stylus corresponding to the voltage at the amplifier input terminals. A calibrated marking line is placed on the paper each 102 steps to provide range scale markings.

The embodiments of the invention in which a particular property or privilege is claimed are defined as follows:

1. A side scan sonar system for recording images of topographical features on an ocean floor, comprising:
    a side looking port transducer and a side looking starboard transducer each having a relatively narrow beam in a horizontal plane and a relatively wide beam in a vertical plane;
    port and starboard transmitter means for driving said port and starboard transducers, respectively, upon receipt of respective port and starboard transmit initiate signals thereby propagating acoustic waves from said transducers;
    port and starboard receiver means connected to said transducers for detecting reflections of said acoustic wave from respective port and starboard topographical features, and for producing respective port and starboard data signals in response thereto; and
    recorder means for providing a visual indication of said data signals, said recorder means including a strip of a recording medium adapted to move in a longitudinal direction, a continuous belt extending transversely across said recording medium, belt drive means for circulating said belt at a predetermined speed, control means for generating said transmit initiate signals when said belt is at a predetermined position, and first and second equally spaced writing styli operatively associated with said port and starboard receiver means, respectively, such that said first stylus is near one edge of said recording medium while said second stylus is near the other edge of said recording medium, and both of said styli are at the center of said recording medium at the same time such that said system may record port data signals from near the right edge of the recording medium to near the left edge of the recording medium, starboard data signals from near the left edge of the recording medium to near the right edge of the recording medium, and both port and starboard data signals from the center of the recording medium toward the left and right edges, respectively, of the recording medium such that said topographical features are recorded in a manner which realistically simulates the spatial relationships between the topographical features and said transducers.

2. A side scan sonar system for recording images of topographical features on an ocean floor, comprising:
    a side looking port transducer and a side looking starboard transducer each having a relatively narrow beam in a horizontal plane and a relatively wide beam in a vertical plane;
    port and starboard transmitter means for driving said port and starboard transducers, respectively, upon receipt of respective port and starboard transmit initiate signals thereby propagating acoustic waves from said transducers;

port and starboard receiver means connected to said transducers for detecting reflections of said acoustic wave from respective port and starboard topographical features, and for producing respective port and starboard data signals in response thereto;

a strip of a recording medium adapted to move in a longitudinal direction;

a continuous belt carrying at least one writing stylus extending transversely across said recording medium;

a belt drive wheel engaging said belt at one end thereof such that rotation of said drive wheel circulates said belt;

a stepping motor operatively connected to said drive wheel, said motor rotating at a speed corresponding to the frequency of sequenced pulses applied to at least three input lines;

an oscillator generating a clock signal having a constant frequency;

a phase-lock loop having a voltage controlled oscillator for generating drive pulses, said voltage controlled oscillator operating at a frequency determined by a control voltage which is, in turn, determined by a phase comparison between said drive pulses and a reference signal derived from said clock signal;

loop control means for selectively reducing the operating frequency of said voltage controlled oscillator below the frequency of said reference signal such that said stepping motor initially operates at a relatively low speed before increasing to a constant operating speed responsive to the frequency of said voltage controlled oscillator increasing to equal the frequency of said reference signal when said phase-lock loop is locked;

pulse sequencing means for generating a sequence of pulses on said stepping motor input lines responsive to said drive pulses, the frequency of said sequence of pulses being proportional to the frequency of said drive pulses such that said belt circulates at a speed determined by the frequency of said clock signal and the manner in which said clock signal is processed by said signal processing means to generate said drive pulses; and control means for generating said transmit initiate signals when said belt is at a predetermined position, and for allowing a writing stylus to record said port data signal when said stylus is moving across said recording medium in one transverse direction and for allowing a writing stylus to record said starboard data signal when said stylus is moving across said recording medium in the other transverse direction such that said topographical features are recorded in a manner which realistically simulates the spatial relationships between the topographical features and said transducers.

3. The side scan sonar system of claim 2 wherein said phase-lock loop further includes lock detection means for generating an unlock signal when the phase of said drive pulses and said reference signal differ by a predetermined value, said unlock signal actuating said loop control means such that the operating frequency of said voltage controlled oscillator is momentarily reduced below the frequency of said reference signal responsive to said phase-lock loop becoming unlocked thereby allowing the speed of said stepping motor to increase to said constant operating speed.

4. The side scan sonar system of claim 2 wherein subsequent to said phase-lock loop becoming unlocked said loop control means periodically reduces the operating frequency of said voltage controlled oscillator responsive to said phase-lock loop remaining unlocked for a predetermined period.

5. The side scan sonar system of claim 2 wherein said belt carries a pair of equally spaced first and second writing styli, and wherein said signal processor means further includes mode selection means for selecting between a port channel record mode, a starboard channel record mode or a dual channel record mode, said recorder means marking said recording medium responsive to said port data signal with said first stylus moving in one transverse direction across substantially the entire width of the recording medium in said port channel record mode, said recorder means marking said recording medium responsive to said starboard data signal with said second stylus moving in the other transverse direction across substantially the entire width of the recording medium in said starboard channel record mode, and said recorder means marking said recording medium responsive to said port data signal with said first stylus moving from the center of said recording medium to one edge thereof and for marking said recording medium responsive to said starboard data signal with said second stylus moving in the other transverse direction from the center of said recording medium to the opposite edge thereof in said dual channel record mode.

6. The side scan sonar system of claim 5 wherein said mode selection means further includes speed adjustment means for increasing the operating speed of said stepping motor in said port and starboard channel record modes such that the period of time said styli move across substantially the entire width of said recording medium in said port and starboard channel record modes is substantially equal to the period said styli move across said recording medium from the center to the edges in said dual channel record mode.

7. The side scan sonar system of claim 1 further including mode selection means for selecting either a port channel record mode, a starboard channel record mode or a dual channel record mode, said recorder recording said port data signal during the period a writing stylus moves from approximately the right edge to approximately the left edge of said recording medium in said port channel record mode, said recorder recording said starboard data signal from approximately the left edge to approximately the right edge of said recording medium in said starboard channel record mode, and said recorder recording said port and starboard data signals from right to left and from left to right, respectively, from the center of said recording medium in said dual channel record mode.

8. The side scan sonar system of claim 7 further including synchronizing means for generating said port transmit initiate signal when said writing stylus is at a predetermined point adjacent the right edge of said recording medium in said port channel record mode, for generating a starboard transmit initiate signal when said writing stylus is at a predetermined point adjacent the left edge of said recording medium in said starboard channel record mode, and for generating a port transmit initiate signal when said writing stylus is at a predetermined point adjacent the center of said recording medium and for generating a starboard transmit initiate signal when said writing stylus is at a predetermined point adjacent the center of said recording medium in said dual channel record mode such that the distance said writing stylus moves subsequent to a transmit inititate signal before marking said recording medium indicates the distance between said towfish and the topographical feature corresponding to the marking on said recording medium whereby topographical features to the port of said towfish are recorded on said recording medium from right to left, and the topographical features to the starboard of said towfish are recorded on said recording medium from left to right with the point on said recording medium corresponding to the towfish being adjacent the right edge of said recording medium in the port channel record mode, adjacent the left edge of said recording medium in the starboard channel record mode and at the center of said recording medium in said dual channel record mode.

9. The side scan sonar system of claim 8 wherein said mode selection means further includes speed adjustment means for adjusting the circulating speed of said belt in accordance with the mode selected such that the time period a stylus moves across substantially the entire width of said recording medium in said port and starboard channel record modes is substantially equal to the time period a stylus moves across said recording medium from the center to the edges in said dual channel record mode such that the range displayed on said recording medium remains constant subsequent to a change in recording mode.

10. The side scan sonar system of claim 9 wherein said mode selection means further includes synchronizing means for generating a synchronizing signal when said writing stylus is at a predetermined point with respect to said recording medium, and belt position indicating means for providing a write enable signal when said stylus has moved a predetermined distance subsequent to said synchronization signal such that the position of said belt with respect to said recording medium is accurately determined when topographical features are recorded on said recording medium.

11. The side scan sonar system of claim 10 wherein said belt position indicating means comprise counting means for generating said write enable signal a predetermined number of drive pulses after the occurrence of said synchronizing signal and for terminating said write enable signal a predetermined number of drive pulses after the initiation of said write enable signal.

12. A side scan sonar system for recording images of topographical features on an ocean floor, comprising:
a side looking port transducer and a side looking starboard transducer each having a relatively narrow beam in a horizontal plane and a relatively wide beam in a vertical plane;
port and starboard transmitter means for driving said port and starboard transducers, respectively, upon receipt of respective port and starboard transmit inititate signals thereby propagating acoustic waves from said transducers;
port and starboard receiver means connected to said transducers for detecting reflections of said acoustic wave from respective port and starboard topographical features, and for producing respective port and starboard data signals in response thereto;
a strip of a recording medium adapted to move in a longitudinal direction;
a continuous belt carrying at least one writing stylus extending transversely across said recording medium;
a belt drive wheel engaging said belt at one end thereof such that rotation of said drive wheel circulates said belt;
a stepping motor operatively connected to said drive wheel, said motor rotating at a speed corresponding to the frequency of sequenced pulses applied to at least three input lines;
an oscillator generating a clock signal having a constant frequency;
signal processing means for generating said drive pulses derived from said clock signal;
pulse sequencing means for generating a sequence of pulses on said stepping motor input lines responsive to said drive pulses, the frequency of said sequence of pulses being proportional to the frequency of said drive pulses such that said belt circulates at a speed determined by the frequency of said clock signal and the manner in which said clock signal is processed by said signal processing means to generate said drive pulses;
a supply reel having a relatively long strip of said recording medium wound around its periphery;
a takeup reel engaging the end of said strip of recording medium, said takeup reel being positioned on the opposite side of said belt from said supply reel such that as said recording medium is rolled on the periphery of said takeup roller, said recording medium unrolls from said supply roller and moves beneath said belt;
a takeup roller drive motor adapted to rotate said takeup roller responsive to a takeup signal;
a supply roller stepping motor allowing said supply roller to rotate responsive to motor drive pulses;
recording medium control means for selectively generating a predetermined number of motor advance pulses responsive to a recording medium advance signal thereby allowing said supply roller to rotate so that said recording medium moves beneath said belt and is rolled onto said takeup roller; and
control means for generating said transmit initiate signals when said belt is at a predetermined position, and for allowing a writing stylus to record said port data signal when said stylus is moving across said recording medium in one transverse direction and for allowing a writing stylus to record said starboard signal when said stylus is moving across said recording medium in the other transverse direction such that said topographical features are recorded in a manner which realistically simulates the spatial relationships between the topographical features and said transducers.

13. The side scan sonar system of claim 39 wherein said recording medium control means comprise:
oscillator means for generating said motor drive pulses between receipt of an oscillator enable signal and receipt of an oscillator disable signal;
means for generating said oscillator enable signal responsive to a recording medium advance signal;
adjustable line counter means for counting said motor drive pulses and for generating said oscillator disable signal responsive to generation of a number of motor drive pulses corresponding to the number selected by said line counter means such that said stepping motor allows said recording medium to advance a distance corresponding to the number selected by said line counter means responsive to a recording medium advance pulse.

14. A side scan sonar system for recording images of topographical features on an ocean floor, comprising:

a side looking port transducer and a side looking starboard transducer each having a relatively narrow beam in a horizontal plane and a relatively wide beam in a vertical plane;

port and starboard transmitter means for driving said port and starboard transducers, respectively, upon receipt of respective port and starboard transmit initiate signals thereby propagating acoustic waves from said transducers;

port and starboard receiver means connected to said transducers for detecting reflections of said acoustic wave from respective port and starboard topographical features, and for producing respective port and starboard data signals in response thereto;

a strip of a recording medium adapted to move in a longitudinal direction;

a continuous belt carrying at least one writing stylus extending transversely across said recording medium;

a belt drive wheel engaging said belt at one end thereof such that rotation of said drive wheel circulates said belt;

a stepping motor operatively connected to said drive wheel, said motor rotating at a speed corresponding to the frequency of sequenced pulses applied to at least three input lines;

an oscillator generating a clock signal having a constant frequency;

signal processing means for generating said drive pulses derived from said clock signal;

pulse sequencing means for generating a sequence of pulses on said stepping motor input lines responsive to said drive pulses, the frequency of said sequence of pulses being proportional to the frequency of said drive pulses such that said belt circulates at a speed determined by the frequency of said clock signal and the manner in which said clock signal is processed by said signal processing means to generate said drive pulses;

write pulse generating means for generating a write pulse responsive to each drive pulse, said write pulses having a constant width less than the minimum width of said drive pulses;

switch means for modulating said data signals with said write pulses such that said data signals are recorded on said recording medium only during the presence of a write pulse whereby the total time period said writing means are responsive to said data signals is constant regardless of the speed said belt circulates; and control means for generating said transmit initiate signals when said belt is at a predetermined position, and for allowing a writing stylus to record said port data signal when said stylus is moving across said recording medium in one transverse direction and for allowing a writing stylus to record said starboard data signal when said stylus is moving across said recording medium in the other transverse direction such that said topographical features are recorded in a manner which realistically simulates the spatial relationships between the topographical features and said transducers.

15. A side scan sonar system for recording images of topographical features on an ocean floor, comprising:

a side looking port transducer and a side looking starboard transducer each having a relatively narrow beam in a horizontal plane and a relatively wide beam in a vertical plane;

port and starboard transmitter means for driving said port and starboard transducers, respectively, upon receipt of respective port and starboard transmit initiate signals thereby propagating acoustic waves from said transducers;

port and starboard receiver means connected to said transducers for detecting reflections of said acoustic wave from respective port and starboard topographical features, and for producing respective port and starboard data signals in response thereto;

a strip of a recording medium adapted to move in a longitudinal direction;

a continuous belt carrying at least one writing stylus extending transversely across said recording medium;

a belt drive wheel engaging said belt at one end thereof such that rotation of said drive wheel circulates said belt;

a stepping motor operatively connected to said drive wheel, said motor rotating at a speed corresponding to the frequency of sequenced pulses applied to at least three input lines;

an oscillator generating a clock signal having a constant frequency;

signal processing means for generating said drive pulses derived from said clock signal;

pulse sequencing means for generating a sequence of pulses on said stepping motor input lines responsive to said drive pulses, the frequency of said sequence of pulses being proportional to the frequency of said drive pulses such that said belt circulates at a speed determined by the frequency of said clock signal and the manner in which said clock signal is processed by said signal processing means to generate said drive pulses;

means for causing said stylus to mark said recording medium responsive to a marker write pulse;

means for generating position pulses having a frequency equal to the frequency of said drive pulses;

counter means for counting said position pulses and for generating a marker after a predetermined number of said position pulses have been counted;

timing means for generating a marker write pulse responsive to said marker pulse, said marker write pulse having a duration which is inversely proportional to the frequency of said drive pulses such that the physical length of the marks on said recording medium are independent of the speed at which said stylus moves across said recording medium;

a phase-lock loop having a voltage controlled time said styli move across substantially the entire width of said recording medium in said first and second cannel record modes is substantially equal to the period said styli move across said recording medium from the center to the edges in said dual channel record mode such that the range displayed on said recording medium remains constant subsequent to a change in recording mode; and control means for generating said transmit inititate signals when said belt is at a predetermined position, and for allowing a writing stylus to record said port data signal when said stylus is moving across said recording medium in one transverse direction and for allowing a writing stylus to record said starboard data signal when said stylus is moving across said recording medium in the other transverse direction such that said topographical features are recorded in a manner which realistically simulates the spatial relationships between the topographical features and said transducers.

16. A side scan sonar system for recording images of topographical features on an ocean floor, comprising:

a side looking port transducer and a side looking starboard transducer each having a relatively narrow beam in the horizontal plane and relatively wide beam in a vertical plane;

port and starboard transmitter means for driving said port and starboard transducers, respectively, upon receipt of respective port and starboard transmit initiate signals thereby propagating acoustic waves from said transducers;

port and starboard receiver means connected to said transducers for detecting reflections of said acoustic wave from respective port and starboard topographical features, and for producing respective port and starboard data signals in response thereto;

a strip of a recording medium adapted to move in a longitudinal direction;

a continuous belt carrying at least one writing stylus extending transversely across said recording medium;

a belt drive wheel engaging said belt at one end thereof such that rotation of said drive wheel circulates said belt;

a stepping motor operatively connected to said drive wheel, said motor rotating at a speed corresponding to the frequency of sequenced pulses applied to at least three input lines;

an oscillator generating a clock signal having a constant frequency;

signal processing means for generating said drive pulses derived from said clock signal;

pulse sequencing means for generating a sequence of pulses on said stepping motor input lines responsive to said drive pulses, the frequency of said sequence of pulses being proportional to the frequency of said drive pulses such that said belt circulates at a speed determined by the frequency of said clock signal and the manner in which said clock signal is processed by said signal processing means to generate said drive pulses;

a variable voltage power supply means operatively associated with said stepping motor for increasing the power applied to said stepping motor as the operating speed of said stepping motor increases so that said stepping motor is capable of operating at a speed corresponding to relatively high frequency drive pulses; and control means for generating said transmit inititate signals when said belt is at a predetermined position, and for allowing a writing stylus to record said port data signal when said stylus is moving across said recording medium in one transverse direction and for allowing a writing stylus to record said starboard data signal when said stylus is moving across said recording medium in the other transverse direction such that said topographical features are recorded in a manner which realistically simulates the spatial relationships between the topographical features and said transducers.

* * * * *